(12) United States Patent
Ishikawa et al.

(10) Patent No.: US 6,434,306 B1
(45) Date of Patent: Aug. 13, 2002

(54) OPTICAL CABLE AND MANUFACTURING METHOD THEREOF

(75) Inventors: Hiroki Ishikawa; Yoshiyuki Suetsugu, both of Kanagawa (JP); Masakazu Watanabe, Research Triangle Park, NC (US); Seigo Ujiie, Kanagawa (JP); Yuji Sera, Ibaragi (JP); Kimio Ando, Gunma (JP)

(73) Assignees: Sumitomo Electric Industries, Ltd., Osaka; Nippon Telegraph and Telephone Corporation, Tokyo, both of (JP)

( * ) Notice: Subject to any disclaimer, the term of this patent is extended or adjusted under 35 U.S.C. 154(b) by 0 days.

(21) Appl. No.: 09/551,620

(22) Filed: Apr. 17, 2000

(51) Int. Cl.$^7$ ................................................. H02B 6/44
(52) U.S. Cl. ...................................... 385/114; 385/113
(58) Field of Search .............................. 385/114, 108, 385/100, 110, 113

(56) References Cited

U.S. PATENT DOCUMENTS

| | | | | |
|---|---|---|---|---|
| 4,801,764 A | * | 1/1989 | Ohlhaber | 174/70 C |
| 5,253,318 A | * | 10/1993 | Sayegh et al. | 385/114 |
| 6,137,936 A | * | 10/2000 | Fitz et al. | 385/113 |

FOREIGN PATENT DOCUMENTS

| | | |
|---|---|---|
| JP | 3-156410 | 7/1991 |
| JP | 10-10384 | 1/1998 |

OTHER PUBLICATIONS

"Development of small aerial drop cable", H. Ishikawa et al., Proceedings of the 1997 OEICE General Conference.

* cited by examiner

Primary Examiner—Tulsidas Patel
(74) Attorney, Agent, or Firm—McDermott, Will & Emery

(57) ABSTRACT

In an optical cable made by forming a sheath on enclosing one or more optical fiber cores and a tension member, high reliability is obtained through the avoidance of adverse effects on the optical fiber core of a curving tendency of the tension member prevailing over the resistance of the sheath to curving (for example, due to the installed optical cable being heated by electrical equipment in proximity) and the optical cable consequently curving. Taking the plane containing the curve formed by the tension member due to its curving tendency as a base plane, the optical fiber core is disposed in the proximity of the position of the image formed when the tension member is projected in a direction perpendicular with respect to the base plane onto a flat plane separate from and parallel with the base plane. If the optical fiber core is an optical fiber ribbon comprising a plurality of optical fibers lined up in a flat plane and coated en bloc, then as an additional condition, an alignment line obtained by joining the centers of the optical fibers at both sides of the optical fiber ribbon is disposed perpendicular to the base plane.

5 Claims, 7 Drawing Sheets

OPTICAL CABLE AND MANUFACTURING METHOD THEREOF

BACKGROUND OF THE INVENTION

This invention relates to an optical cable for a customer-use to be connected between an outdoor optical cable line and private residence or the like, and especially to an optical cable having good reliability through the elimination of the effects of stress on an optical fiber core of the cable arising as a result of a curving tendency of a tension member of the cable, and to a method for manufacturing thereof.

There have been optical cables for a customer-use consisting of a tension member such as a steel wire and an optical fiber core disposed in parallel and covered with a sheath made of plastic or the like, for example, having the structure shown in FIG. 4A (Japanese Unexamined Patent Publications Nos. H.10-010384, H.3-156410).

However, in this kind of optical cables for a customer-use, when the tension member has a curving tendency, if the sheath softens due to being heated to a high temperature by the condition of the environment in which the optical cable was installed, for example, by being exposed under released heat from electrical equipment, the curving tendency of the tension member prevails, and consequently stress acts upon the optical fiber core, and damage such as increased transmission loss or breakage of the optical fiber core occurs.

This phenomenon will now be described specifically, using the drawings.

When the sheath 4 of the optical cable shown in FIG. 4A softens by heating, the curving tendency of the tension member 1 may prevail and deformation shown in FIGS. 4B and 4C may occur.

When the optical fiber core 2 is pushed to the inner side of the arc of a tension member 1 whose curving tendency has prevailed, as shown in FIG. 4B, the optical fiber core 2 suffers stress caused by irregular contracted deformation, and its light transmission loss increases. When the optical fiber core 2 is pushed to the outer side of the arc of a tension member 1 whose curving tendency has prevailed, tension acts on the optical fiber core 2, causing possible breakage of the optical fiber core.

Typical types of curving tendency of the tension member 1 of an optical cable are shown in FIGS. 6A, 6B and 6C.

Here, the direction of the curving tendency of the tension member 1 is shown by the direction →R from a tension member 1a, whose curving tendency has prevailed in a natural state wherein it is free from constraint by external force, to its center of curvature O, and the degree of the curving tendency is shown by the size of the radius of curvature R. The direction →R of a curving tendency according to this definition is naturally included in the flat plane (hereinafter called the base plain) containing the tension member 1 and the center of curvature O.

The base plain is shown in FIGS. 6A, 6B and 6C with the reference numerals 200, 300 and 400, respectively.

If the curving tendency is the same along the entire length of the tension member 1, the directions →R of the curving tendencies of all parts of the tension member 1 point toward the same center of curvature O, and their sizes R also take the same value.

When the tension member is wound on a bobbin or straightened under tension or supported by a sheath, this curving tendency is largely constrained by external force and is latent, but when it is freed from external force for example due to the sheath of an optical cable being heated and softening after the cable is installed, the curving tendency prevails and the aforementioned damage occurs.

Hereinafter, except when otherwise indicated, the tension member 1 is referred to in a state such that its curving tendency is constrained by some external force and is completely latent.

The type of curving tendency shown in FIG. 6A is such that the optical fiber core 2 is disposed in a flat plane 220 adjacent to and parallel with the base plane 200 containing the tension member 1 and the direction →R and center of curvature O of its curving tendency, and in the position of the tension member 1 as projected perpendicularly onto that plane. The optical cable shown in FIG. 1 is in the category of the curving tendency type of this FIG. 6A.

In FIG. 6A, the reference numerals 1, 11 denote the tension member with its curving tendency constrained; 2, 12b the optical fiber core in a state corresponding to that; 1a the tension member 1, 11 with its curving tendency having prevailed; and 2a the optical fiber core 2, 12b in a state corresponding to that.

The type of curving tendency shown in FIG. 6B is such that the optical fiber core 2 is in a base plane 300 containing the tension member 1 and the direction →R and center of curvature O of its curving tendency, and the optical fiber core 2 is disposed in parallel with the tension member 1 and on the same side thereof as the direction →Ra of its curving tendency. The deformation of an optical cable due to its curving tendency prevailing as shown in FIG. 4B is of the category of the curving tendency type shown in this FIG. 6B.

The type of curving tendency shown in FIG. 6C is such that the optical fiber core 2 is in a base plane 400 containing the tension member 1 and the direction →R and center of curvature O of its curving tendency, and the optical fiber core 2 is disposed in parallel with the tension member 1 but on the opposite side thereof from the direction →Rb of its curving tendency. The deformation of an optical cable deforming due to its curving tendency prevailing as shown in FIG. 4C is of the category of the curving tendency type shown in this FIG. 6C.

Optical cables have been manufactured by the kind of method shown in FIGS. 7A and 7B. For example, a tension member 1 is given a downward curving tendency by a tension member supply 20, and is supplied together with an optical fiber 12b disposed below it to an extrusion sheathing apparatus. In the extrusion sheathing apparatus, the tension member 1 and the optical fiber 12b are integrated by a sheath being formed on them by a crosshead 40 having a die 40a with a skittle-shaped opening 40b such as that shown in FIG. 7C, after which they are taken up on a takeup drum 60 as a completed optical cable.

An optical cable manufactured by this process is of the category of the curving tendency type shown in FIG. 6B. If either the tension member supply 20 or the die 40a shown in FIGS. 7A and 7B are vertically inverted, the positional relationship between the curving tendency of the tension member 1 and the optical fiber core 2 is inverted and an optical cable of the category of the curving tendency type shown in FIG. 6C is manufactured. Thus, optical cables have normally been of the category of the curving tendency type shown in FIG. 6B or FIG. 6C.

The types of curving tendencies of optical cable shown in FIGS. 6A through 6C are merely typical, and an infinite number of types intermediate between these can also exist, depending on the positional relationship between the optical fiber core 2 and the direction of the curving tendency of the tension member 1. And different curving tendencies can exist in the same optical cable at different positions in the length direction of the optical cable.

When an optical cable has the type of curving tendency of the tension member 1 shown in FIG. 6B or 6C, there is the adverse effects on the optical fiber core 2 as shown in FIGS. 4B and 4C due to prevailing this tendency. On the other hand, when an optical cable has the type of curving tendency of the tension member 1 shown in FIG. 6A, there is almost no adverse effect on the optical fiber core 2.

Although it has been possible for an optical cable of related art coincidentally to include the type of curving tendency shown in FIG. 6A, the technological ideal of deliberately, actively providing the tension member 1 with this type of curving tendency over the entire length of the optical cable to protect the optical fiber core has not been proposed before.

(Hereinafter, the vertical direction refers to the direction in which gravity acts, and the horizontal direction refers to a direction perpendicular to the vertical direction.)

SUMMARY OF THE INVENTION

An object of the present invention is to provide a highly reliable optical cable by preventing adverse effects produced on an optical fiber core when a curving tendency of a tension member prevails, by manufacturing the optical cable in such a way that the optical cable is of the category of the curving tendency type shown in FIG. 6A over its entire length.

To achieve this object and other objects, the invention provides an optical cable comprising at least one optical fiber core and a tension member and a sheath, wherein the tension member has a curving tendency and when the flat plane containing the curve formed by the tension member due to its curving tendency is taken as a base plane, the optical fiber core is disposed in the proximity of the position of the image formed when the tension member is projected perpendicularly with respect to the base plane onto a flat plane separate from and parallel with the base plane.

The invention also provides a method for manufacturing an optical cable by disposing in parallel and covering with a sheath by an extruder at least one optical fiber core and a tension member having a curving tendency, wherein when the flat plane containing the curve formed by the tension member due to its curving tendency is taken as a base plane, the sheath is formed with the optical fiber core disposed in the proximity of the position of the image formed when the tension member is projected perpendicularly with respect to the base plane onto a flat plane separate from and parallel with the base plane.

That is, an optical cable according to the invention is made by integrating a tension member 1 and an optical fiber core 2 by forming on them a sheath 4 with the tension member 1 extended in a horizontal direction after having been positively provided with a curving tendency of a fixed radius of curvature R in a horizontal direction and with the optical fiber core 2 disposed in a flat plane 220 adjacent to and parallel with the base plane 300 containing the tension member 1 and the center of curvature O of its curving tendency and in the position of the tension member 1 as projected perpendicularly onto that plane, as shown in FIG. 1A and FIG. 6A.

In the case of an optical cable containing an optical fiber ribbon, in addition to these conditions, effects of the curving tendency prevailing are avoided by the alignment line (500 in FIG. 2C), i.e. the line obtained by joining the centers of the optical fibers at the both sides of the ribbon, being disposed perpendicular to the base plane.

As a result of this construction, due to the relation with the direction →R of the curving tendency of the tension member 1, an optical cable according to this invention curves in the manner shown in FIG. 1B over the entire length of the optical cable, even when the curving tendency of the tension member 1 prevails after the optical cable is manufactured.

In this case, although tensile and compressive stresses act respectively upon the sheath on the outer side and the inner side of the arc of the curved optical cable, in the central position where the optical fiber core is located, these stresses cancel out and have no substantial effect upon the optical fiber core.

As described above, even when the curving tendency of the tension member prevails and the optical cable curves, all that happens is that the tension member and the optical fiber core curve with the same curvature, and the optical fiber core does not suffer stress due to either compression or tension.

Thus, a highly reliable optical cable which suffers neither increased transmission loss nor breakage can be realized.

BRIEF DESCRIPTION OF THE DRAWINGS

FIG. 6A is a case of an optical cable with a tension member having a horizontal curving tendency of direction →R and an optical fiber core disposed in a flat plane 220 adjacent to and parallel with a base plane 200 containing the tension member and the center of curvature O of its curving tendency and in the proximity of the position of the tension member as projected perpendicularly onto that plane. FIG. 6B is a case of an optical cable with a tension member having a downward curving tendency of direction →Ra and an optical fiber core disposed parallel with the tension member on the side thereof of the direction of the curving tendency. FIG. 6C is a case of an optical cable with a tension member having a downward curving tendency of direction →Rb and an optical fiber core disposed parallel with the tension member on the opposite side thereof from the direction of the curving tendency;

DETAILED DESCRIPTION OF THE PREFERRED EMBODIMENTS

Figure 1A:
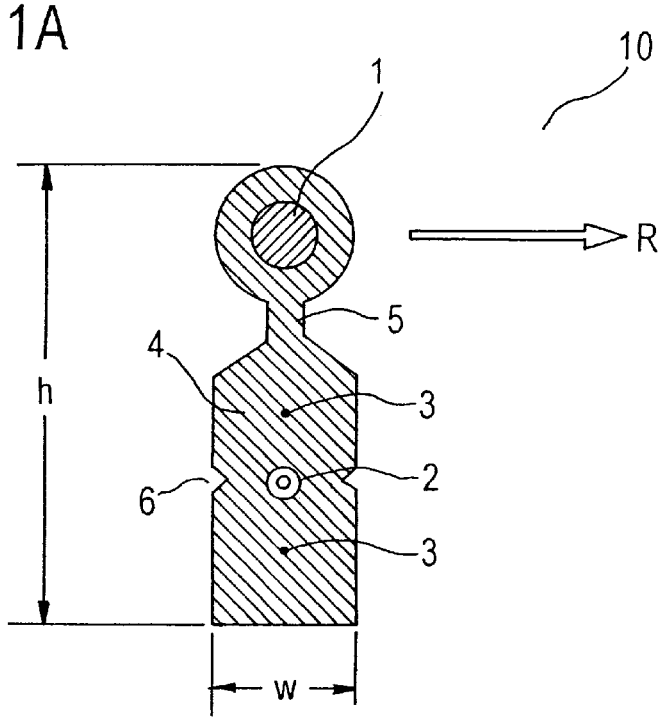
FIG. 1A is a sectional view showing the construction of an optical cable according to the invention, together with the direction →R of a curving tendency of a tension member thereof.

Preferred embodiments of the invention will now be described on the basis of FIGS. 1A through 3B and FIGS. 6A through 6C. The same parts have been given the same reference numerals and duplicate descriptions have been omitted.

EXAMPLE 1

Figure 6A:
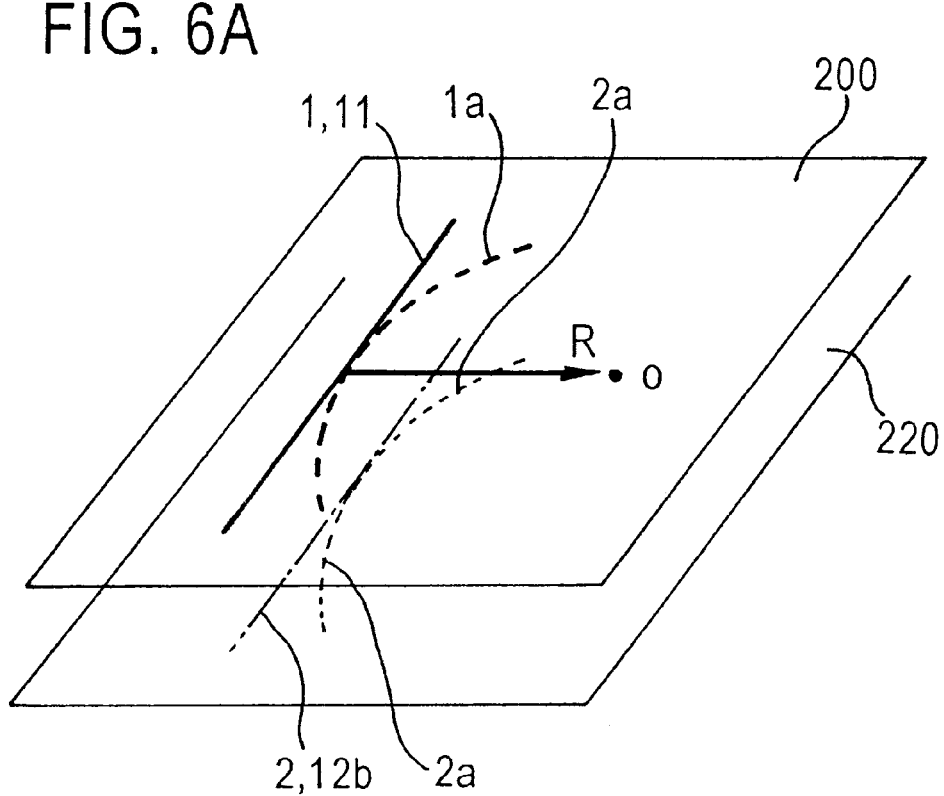
FIGS. 6A through 6C are perspective views illustrating different types of curving tendency of a tension member in an optical cable.

This example is a case wherein a tension member 1 of an optical cable is provided with the curving tendency shown in FIG. 6A. That is, it is a case wherein an optical fiber core 2 is disposed in a flat plane 220 parallel with a base plane 200 containing the tension member 1 and the center of curvature O of its curving tendency and in the proximity of the position of the tension member 1 as projected perpendicularly onto that plane.

The construction of the optical cable of this example is shown in FIG. 1A. In this figure, the reference numeral 1 denotes a tension member consisting of a steel wire of diameter 1.2 mm, and 2 denotes an optical fiber core of diameter 250 μm coated with an ultraviolet-curing resin, and 3 denotes a copper wire of diameter 0.4 mm for use as a telephone line. The distance between the respective centers of the tension member 1 and the optional fiber core 2 is 2.5 mm.

A sheath 4 made of polyvinyl chloride resin has the function of covering and integrating the tension member 1 and the optical fiber core 2 and protecting them from the environment. The thickness of this sheath 4 is 0.4 mm around the periphery of the tension member 1. A neck part 5 having a thickness 0.2 mm and length 0.3 mm connects the part containing the tension member with a part containing the optical fiber core 2. The reference numeral 6 denotes a notch for facilitating the operation of exposing the optical fiber core 2 at the end of the optical cable in construction work and the like.

The size of the cross-section of this optical cable as a whole is height h: 5 mm, width w: 2 mm.

(Manufacturing Method)

By winding a tension member 1 onto a rotating cylinder having a curvature radius of 0.8 m and heat-treating it, irregular curving tendencies were eliminated and the tension member 1 was actively provided with a horizontal-direction curving tendency of curvature radius 1 m.

With this tension member 1 straightened by tension applied in a horizontal direction, the tension member 1 and the optical fiber core 2 and two copper wires 3 disposed in positions on either side of the optical fiber core 2 were all aligned in parallel in a vertical plane, supplied to an extruder with a die having an opening whose section matches the cross-sectional profile of the optical cable shown in FIG. 1A, covered with thermally melted polyvinyl chloride resin, and cooled, whereby an optical cable of the cross-sectional structure shown in FIG. 1A was manufactured.

The manufactured optical cable was wound onto a bobbin of diameter 50 cm having its center axis positioned in the same vertical direction as that of the above-mentioned rotating cylinder, to prevent it from developing a curving tendency of a different direction from the curving tendency of the tension member 1.

With the optical cable still being wound on the bobbin, the result of measuring the transmission loss of a bundle of laser light rays of wavelength 1.55 μm was 0.19 dB/km.

The curvature radius of the manufactured optical cable at room temperature in its natural state, unwound from the bobbin, was about 5 m, and thus the curving tendency of the tension member 1 to have a radius of curvatuve R=1 m was considerably constrained by the material strength of the polyvinyl chloride resin of the sheath 4.

Then, a 500 m length of the optical cable in this state was subjected to a heat cycle to cause the curving tendency of the tension member 1 to prevail.

That is, a cycle of heating the optical cable at a rate of 1° C./min to +70° C. and leaving it for 2 hours, then cooling it at a rate of 1° C./min to −30° C. and leaving it for another 2 hours, was repeated 3 times.

Figure 1B:
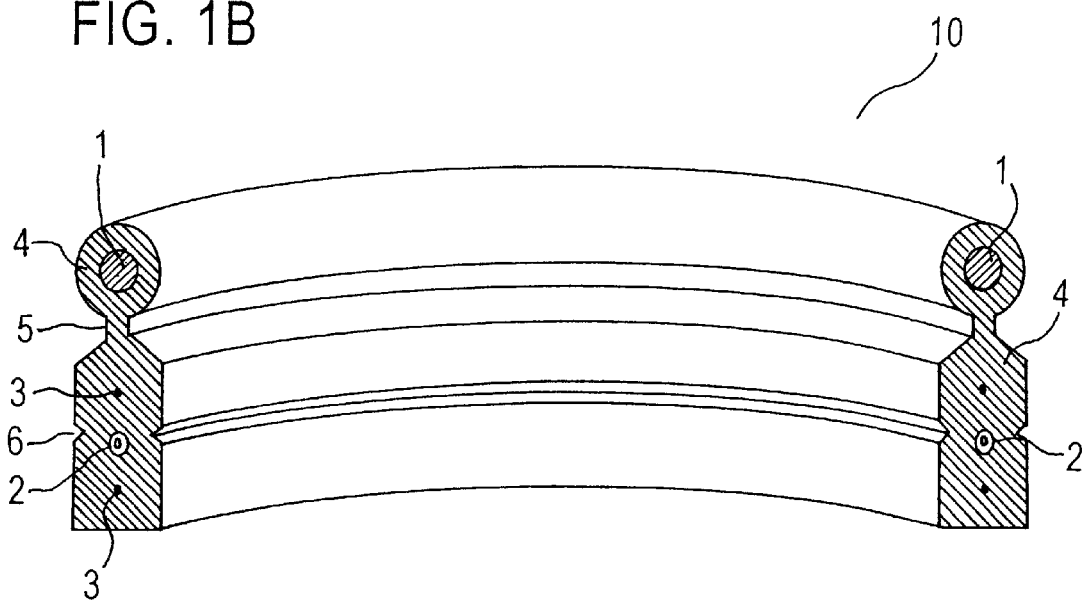
FIG. 1B is a perspective view showing the optical cable having heat-deformation due to prevailing of the curving tendency of the tension member.

In the optical cable after this heat cycle, as a result of the curving tendency of the tension member 1, the part containing the tension member 1 and the part containing the optical fiber core 2 had both deformed to concentric circular shapes of the same curvature radius, as shown in FIG. 1B. The curvature radius of the optical cable as a whole was about 2.5 m in this state, with respect to the size R=1 m of the curvature radius of the curving tendency of the tension member 1.

The transmission loss of the optical cable in this state, when measured using the same conditions as mentioned before, to obtain the increase of the transmission loss caused by the thermal deformation resulting from the heat cycle, was 0.03 dB/km, an extremely small, negligible size.

A likely explanation for this is because when the optical cable undergoes the kind of curving shown in FIG. 1B, although compressive stress acts on the sheath 4 on the inner side of the arc of the optical cable and tension acts on the sheath 4 on the outer side of the arc, these stresses cancel each other out at the position of the optical fiber core 2 located in the center, and almost no stress acts upon the optical fiber core 2.

Comparative Example 1

Figure 6B:
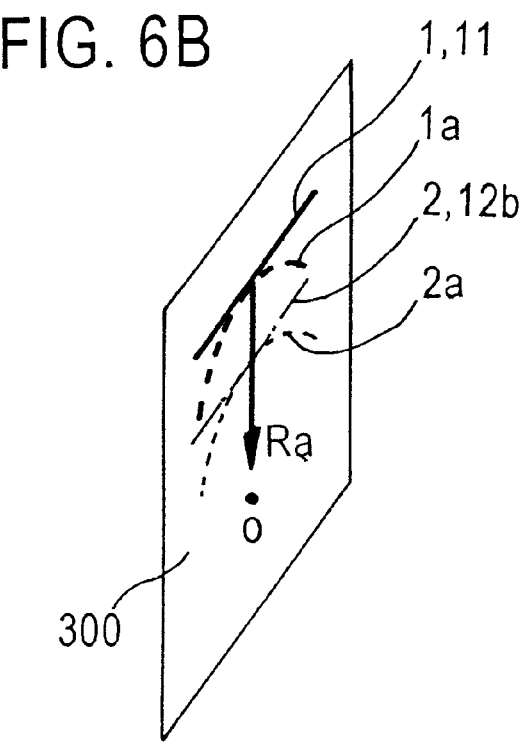
Figure 6C:
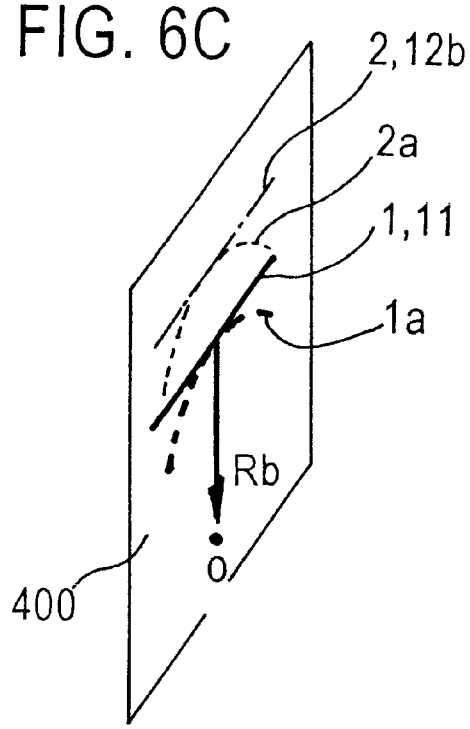
Figure 7A:
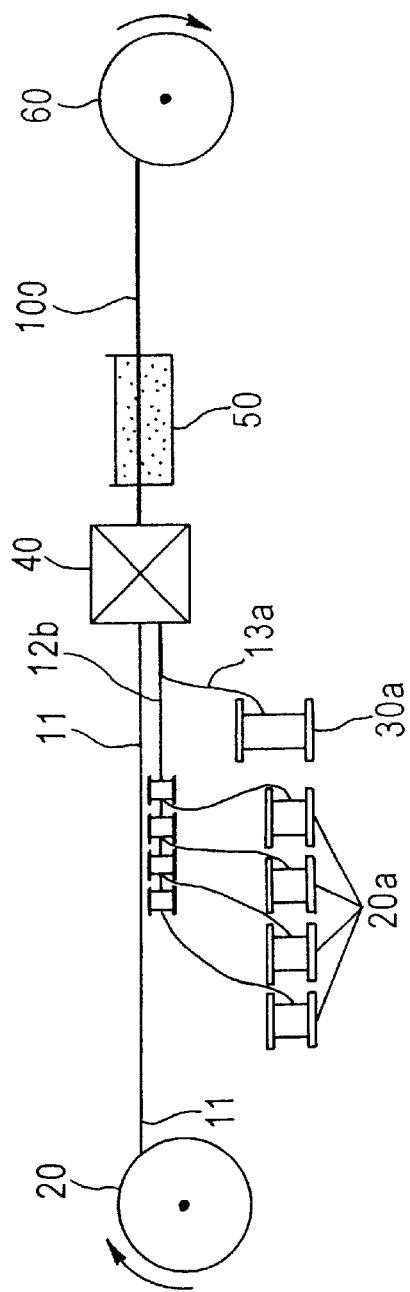
FIG. 7A is a side view.
Figure 7B:
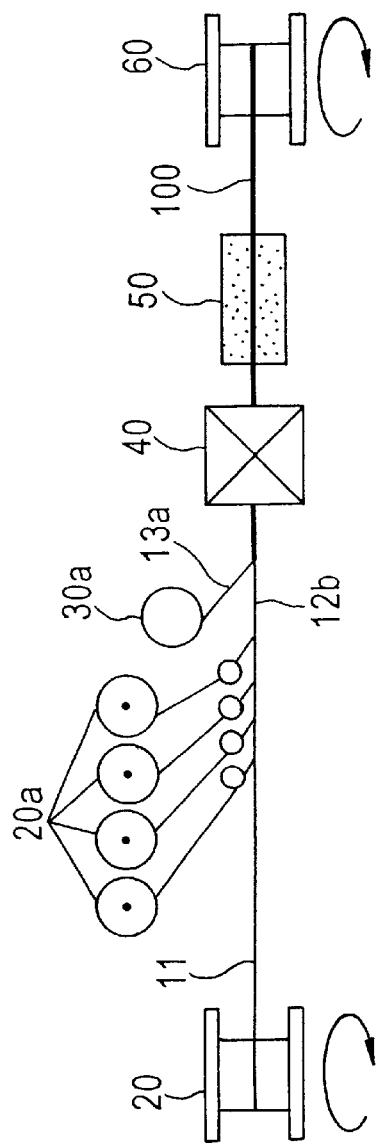
FIG. 7B is a plane view of an apparatus for manufacturing an optical cable of related art.
Figure 7C:
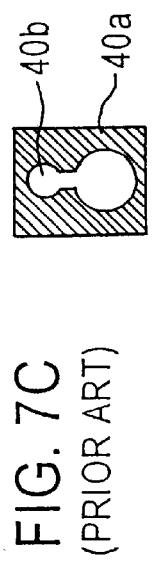
FIG. 7C is a sectional view showing the shape of an opening of a die of an extruder.

This comparative example is a case wherein the tension member 1 of an optical cable having the same sectional structure as the example 1 is given the curving tendency shown in FIG. 6B. The effects of the invention were clarified by manufacturing an optical cable having a tension member 1 provided with a curving tendency whose direction →Ra is toward the optical fiber core 2 side, subjecting this to a heat cycle to cause deformation of the kind shown in FIG. 6B, and comparing the size of the increase in the transmission loss resulting from the thermal deformation with that of the case of the example 1.

That is, with the tension member 1 extended in a horizontal direction after being given a downward curving tendency an optical fiber core 2 was disposed on the lower side of the tension member 1 and made parallel therewith, and under the same conditions as in the example 1, these were integrated by a sheath 4 made of polyvinyl chloride resin being formed on them, whereby an optical cable having its tension member provided with a curving tendency in the direction →Ra of the optical fiber core 2 was manufactured, and this was wound on a bobbin of the same radius of 50 cm as in the example 1.

The curvature radius of the optical cable of this comparative example at room temperature was 7.5 m in its natural state, unwound from the bobbin, and thus was larger than the 5 m curvature radius of the optical cable of the example 1. This is because the curving tendency of the tension member 1 was relatively strongly constrained, due to the effect of the shape of the optical cable cross-section being greater than in the case of the example 1 as a result of the direction →Ra of the curving tendency.

This optical cable was subjected to a heat cycle to cause the curving tendency of its tension member to prevail, and its transmission loss was then measured, with the same heat cycle load conditions and the same transmission loss measurement conditions as in the example 1.

Figure 4A:
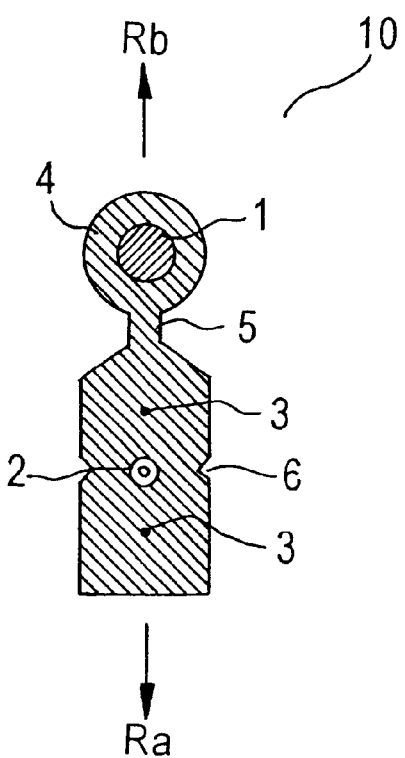
FIG. 4A is a sectional view showing the construction of an optical cable of related art together with directions →Ra and →Rb of a curving tendency of a tension member thereof.
Figure 4B:
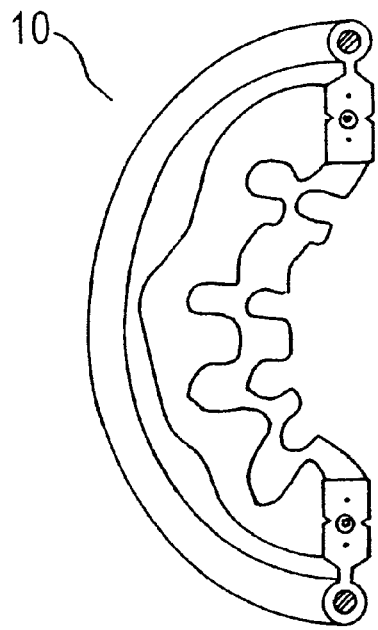
FIG. 4B is a perspective view showing the optical cable having heat-deformation in the direction →Ra, i.e. to the side of the tension member on which an optical fiber core of the optical cable is disposed.
Figure 4C:
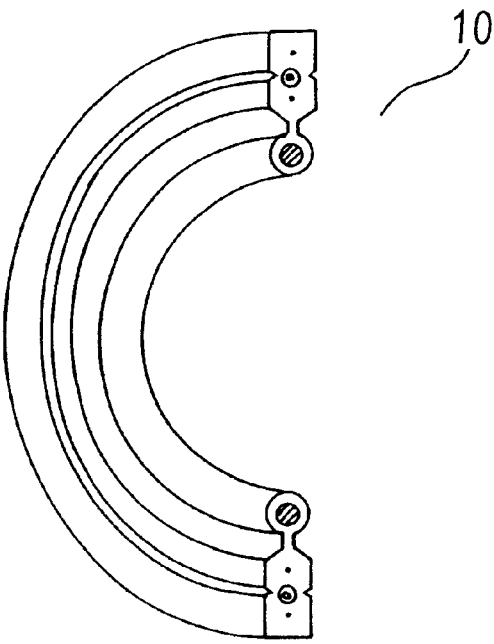
FIG. 4C is a perspective view showing the optical cable having heat-deformation in the direction →Rb, i.e. to the opposite side of the tension member from that on which the optical fiber core of the optical cable is disposed.

In the optical cable after the heat cycle, compressive deformation shown in FIG. 4B was observed, and the curvature radius of the optical cable as a whole was about 4 m.

The transmission loss of the optical cable when wound on the bobbin before the heat cycle was 0.19 dB/km and thus was not different from the example 1. This is probably because when wound on the bobbin, the optical cable is kept in the same shape as in the example 1 and the curving tendency is constrained.

The increase in transmission loss after the heat cycle was 0.33 dB/km. This is ten times as great as in the case of the example 1.

The comparison of the results of this comparative example and the example 1 shows that by employing the form of curving tendency shown in FIG. 6A which was employed in the example 1, it is possible to markedly suppress transmission loss caused by environmental heat sources after the optical cable is installed.

EXAMPLE 2

Figure 2A:
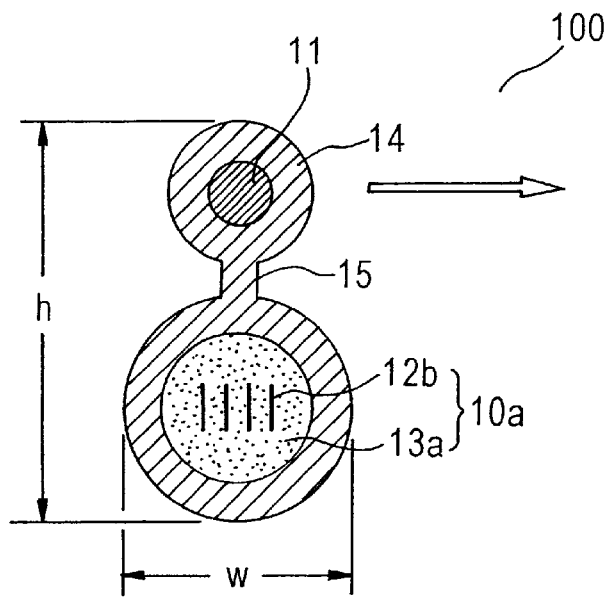
FIG. 2A is a sectional view showing the construction of an optical cable according to the invention containing optical fiber ribbons, together with the direction →R of a curving tendency of a tension member thereof.

This example 2 is a case wherein the invention is applied to an optical cable in which optical fiber ribbons are used, instead of the optical fiber core of the example 1. That is, as shown in FIG. 2A, in the optical cable of this example 2, four-core optical fiber ribbons 12b shown in FIG. 2C are used in place of the optical fiber core 2, and the alignment line (500 in FIG. 2C) obtained by joining together the center of the optical fibers at the both sides of the ribbon is disposed perpendicular to the base plane.

For an optical cable in which optical fiber ribbons 12b are used, in addition to the conditions required for an optical cable having an ordinary wire-shaped optical fiber core 2, the direction of the alignment line of the optical fiber ribbons 12b is disposed in a direction perpendicular to the base plane 200 containing the center of the tension member 11 and the center of curvature O of its curving tendency.

The 'perpendicular direction' used here is not mathematically strict and includes manufacturing errors of up to about 5° with respect to this perpendicular direction when an optical cable is actually manufactured, and this understanding is included in the 'perpendicular direction' used in this invention, including the case of the example 1.

As a result of the alignment lines of the optical fiber ribbons 12b being disposed in this kind of direction, even when the curving tendency of the tension member 11 has prevailed, the optical fiber ribbons 12b do not suffer any significant effect of stress due to the curving tendency of the tension member 11, because they curve in a direction perpendicular to their alignment lines.

In the optical cable of FIG. 2A, the tension member 11 is a steel wire of diameter 2.6 mm and has a curving tendency whose curvature radius R is 3 m in the horizontal direction, i.e. the direction →R of FIG. 2A. The optical fiber ribbons 12b are four-core optical fiber ribbons of thickness 0.3 mm, width 1.1 mm, each comprising four optical fiber cores 2 of the same diameter 250 μm.

An optical cable core 10a of diameter 5 mm comprises a polypropylene fiber layer 13a disposed on a stack of four of these optical fiber ribbons 12b. The alignment lines of the optical fiber ribbons 12b contained in the optical cable core 10a are disposed in a direction perpendicular to a base plane 200 containing the tension member 11 and the center of curvature O of its curving tendency.

A sheath 14 made of polyethylene covers the tension member 11 to a thickness of 1.5 mm and also covers the optical cable core 10a to a thickness of 1.5 mm, and has a neck part 15 of thickness 2 mm, length 2.4 mm by which the tension member 11 and the optical cable core 10a are joined together.

The distance between the center of the tension member 11 and the center of the optical cable core 10a is 9.2 mm. The size of the optical cable as a whole is height h: 16 mm, maximum width w: 8 mm.

(Manufacturing Method)

Figure 3A:
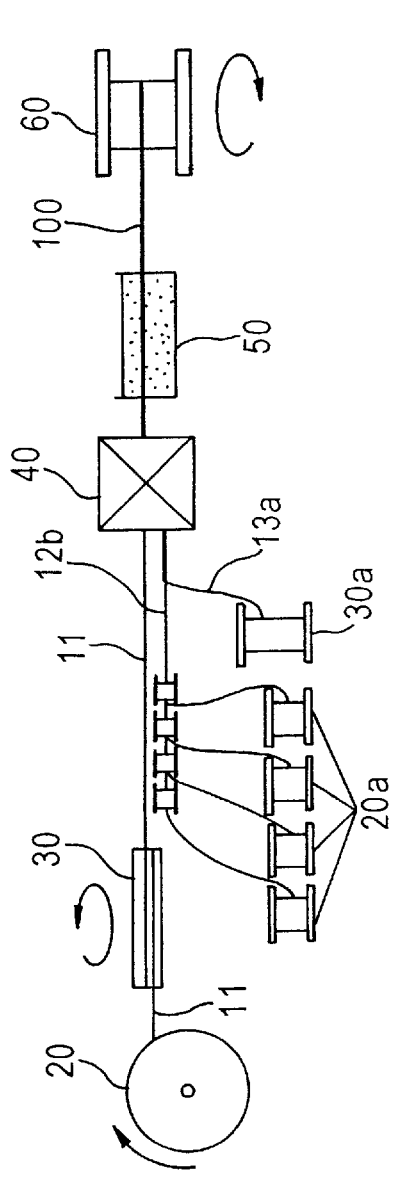
FIG. 3A is a side view and FIG. 3B is a plane view of an apparatus for manufacturing an optical cable according to the invention.
Figure 3B:
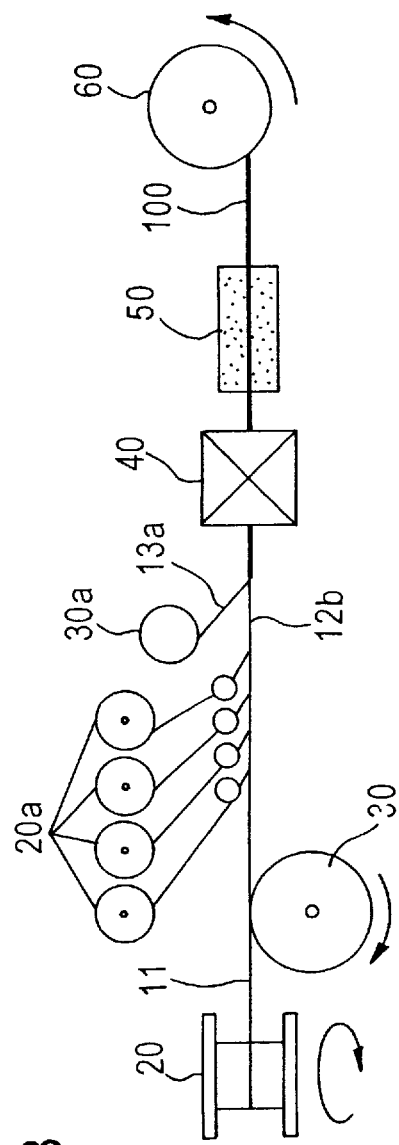

The manufacturing method of the optical cable 100 of this example 2 is shown in FIGS. 3A and 3B, that is, first, the tension member 11 is supplied from a tension member supply 20, which is a drum carrying a 2.6 mm diameter steel wire, wound around a turntable 30 of radius 2.5 m, which has its center axis oriented in the vertical direction, and heat-treated, thereby being provided with a curving tendency of a horizontal curvature radius R of 3 m, and supplied under tension to a crosshead 40 of an extruder.

At the same time, four optical fiber ribbons 12b stacked with their alignment lines oriented in the vertical direction are supplied from four optical fiber supplies 20a each consisting of a bobbin carrying one four-core optical fiber ribbon 12b, and onto the outside of these, are wound to a diameter of 55 mm, a polypropylene fiber 13a let out from a fiber supply 30a consisting of a bobbin carrying this polypropylene fiber 13a, whereby a optical cable core 10a is formed.

Figure 3C:
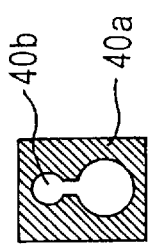
FIG. 3C is a sectional view showing the shape of an opening of a die of an extruder.

With the optical cable core 10a disposed in a position below the tension member 11 and parallel therewith and so that the distance between their centers is 9.2 mm, they are supplied to a crosshead 40 of an extruder having a die 40a with a skittle-shaped opening 40b such as that shown in FIG. 3C matching the dimensions of the cross-section of the optical cable of FIG. 2A, and covered with polyethylene, whereby a sheath 14 is formed and they are integrated.

From the die 40a of the crosshead 40 the optical cable 100 covered with polyethylene is guided under tension to a cooling water bath 50 and cooled to room temperature, and then wound onto a takeup drum 60 of radius 1 m.

In this case, so that a new curving tendency differing from the direction of the curving tendency of the tension member 11 is not given to the manufactured optical cable, the center axis of the takeup drum 60 is oriented in the same vertical direction as the turntable 30, and the optical cable is taken up in the same direction as the curving tendency of the tension member 11.

(Transmission Loss)

The transmission loss of an optical cable manufactured as described above while on the drum 60 of radius 1 m was measured under the same conditions as in the example 1 and found to be 0.20 dB/km, which was about the same as the value for an ordinary optical cable.

The curvature radius of the manufactured optical cable was 7 m at room temperature in its natural state, unwound from the takeup drum 60. This is the result of the curving tendency of curvature radius R of 3 m of the tension member 11 being constrained by the material strength of the polyethylene of the sheath 14.

Figure 2B:
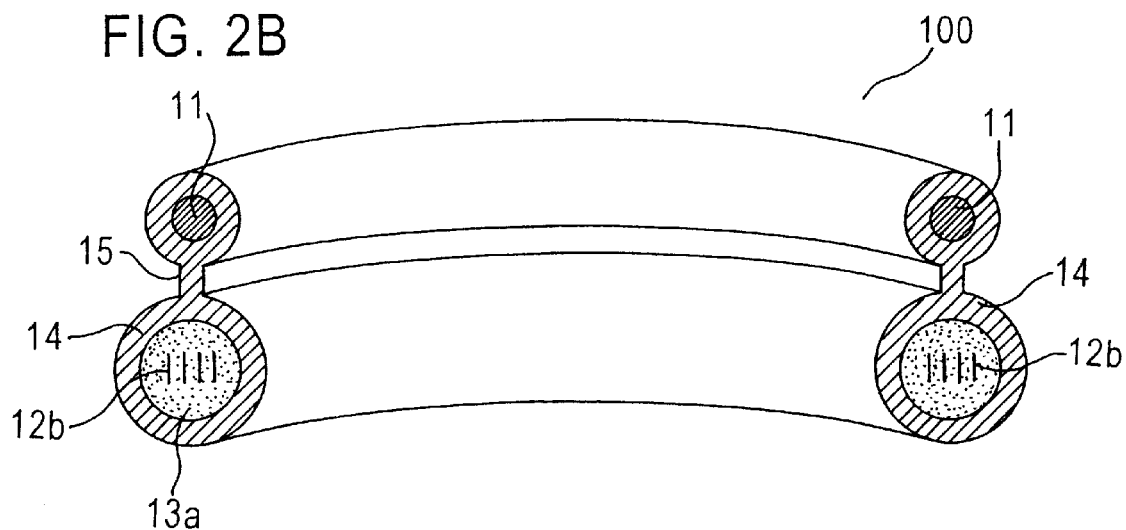
FIG. 2B is a perspective view showing the optical cable having heat-deformation due to prevailing the curving tendency of the tension member.
Figure 2C:
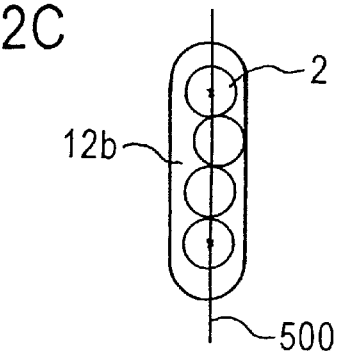
FIG. 2C is a sectional view illustrating the alignment line of an optical fiber ribbon having four optical fibers.

A 500 m length of the optical cable in this state was subjected to a heat cycle under the same conditions as in the example 1, resulting in its deformation as shown in FIG. 2B. The curvature radius of the optical cable was about 5 m after being subjected to the heat cycle.

When the transmission loss of the optical cable in this state was measured by the same method as in the example 1, only a slight light loss increase of 0.03 dB/km was observed, a level which, as in the example 1, is negligible.

Comparative Example 2

This comparative example 2 is a case wherein, using the same approach as in the comparative example 1, the tension member 11 of an optical cable having the same sectional structure as the example 2 is given the curving tendency shown in FIG. 6B.

An optical cable having a structure wherein an optical cable core 10a is disposed on the side of the direction →Ra of the curving tendency of a tension member 11 was manufactured by a method conforming to the example 2. The manufactured optical cable was subjected to a heat cycle to induce thermal deformation shown in FIG. 5B, and the increase in transmission loss was ascertained and compared with the case of the example 2.

Figure 5A:
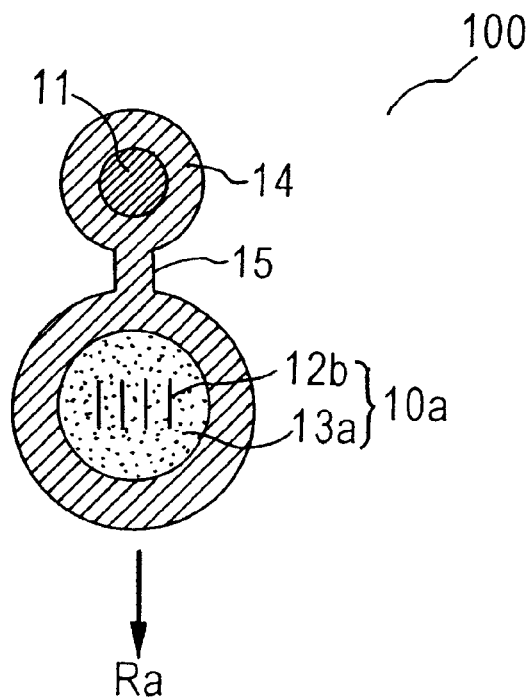
FIG. 5A is a sectional view of an optical cable serving as a second comparison example together with the direction →Ra of a curving tendency of a tension member thereof and FIG. 5B is a perspective view showing the optical cable having heat-deformation.

In this case, as can be understood from FIG. 5A and FIG. 6B, the center of the optical cable core 10a is contained in the base plane 300 containing the tension member 11 and the direction →Ra and center of curvature O of its curving tendency, and the alignment lines of the four optical fiber ribbons 12b are all disposed in parallel with this plane.

The manufacturing method of this comparative example 2 differs from the example 2 in that, in the optical cable manufacturing apparatus shown in FIGS. 3A and 3B, the axis direction of the turntable 30 is oriented in the horizontal direction and by the tension member 11 being wound around this turntable the tension member is given a curving tendency of a curvature radius R of 3 m in the downward direction. The remaining manufacturing conditions are the same as in the example 2.

The curvature radius of the optical cable of this comparative example 2 was about 10 m at room temperature in its natural state, unwound from the takeup drum 60. This value is larger than in the case of the optical cable of the example 2, where the curvature radius was 7 m, because, in addition to the material strength of the polyethylene of the sheath 4, due to the effect of the direction of the curving tendency of the tension member 11 and the shape of the cross-section of the optical cable, the curving tendency of curvature radius R=3 m of the tension member 11 is more strongly constrained than in the case of the example 2.

This optical cable was subjected to a heat cycle under the same load conditions as in the example 2, and under the same measurement conditions the increase in the transmission loss in the optical cable between before and after the heat cycle was measured.

Figure 5B:
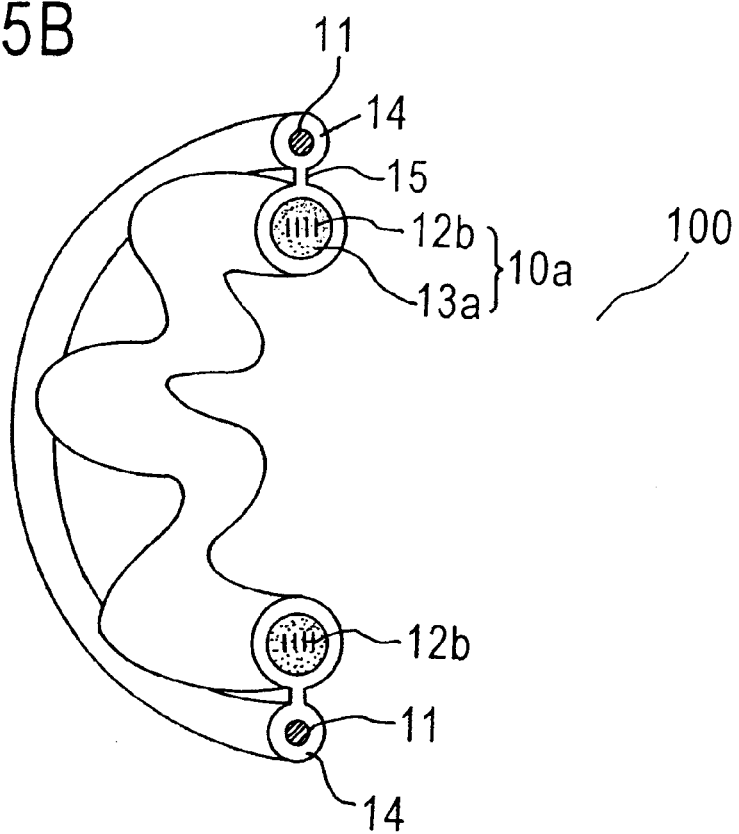

Deformation shown in FIG. 5B was observed in the optical cable after the heat cycle, and its curvature radius was about 6 m.

The transmission loss in the optical cable was 0.20 dB/km when still wound on the takeup drum 60 before the heat cycle and thus was not different from the case of the example 2. However, as the increase in transmission loss after the heat cycle, a value of 0.53 dB/km was obtained, as much as eighteen times larger than in the example 2.

From the results of comparing this comparative example 2 with the example 2, the same conclusion as that of the comparison between the comparative example 1 and the example 1 is obtained. That is, by employing the form of curving tendency shown in FIG. 6A which was applied in the example 2, it is possible to markedly suppress transmission loss caused by environmental heat sources after the optical cable is installed.

However, in the case of the example 2, because the sectional area of the optical cable is larger, the effects of the invention are even more distinct than in the example 1.

In the case of the example 2, the alignment lines of the optical fiber ribbons 12b were disposed in a direction perpendicular to the base plane 200 containing the tension member 11 and the center of curvature O of its curving tendency (see FIG. 6A); however, the invention is not limited only to this case, but it is also effective, for example, in a case where the alignment lines are disposed in a direction to form acute angles on either side to the plane perpendicular to the base plane as a bisecting line.

And although in the foregoing example 1 and example 2 the tension member was provided with a curving tendency before the sheathing of the optical cable by the extruder, this is not due to any limitation of the invention, and it is also possible to provide a fixed curving tendency after the optical cable is manufactured by winding the optical cable around the turntable while heating the tension member, for example, by passing a current through it.

And although in the foregoing example 1 and example 2 single steel wires were used for the tension members 1, 11, this is not due to any limitation of the invention, and twisted steel wires or other metal wires can be used alternatively.

What is claimed is:

1. An optical cable comprising:
    at least one optical fiber core and a tension member, the optical fiber core and the tension member tightly encapsulated in a sheath, wherein
    the tension member has a curving tendency that defines a curve in a base plane taken through a section of the tension member, and
    the optical fiber core is disposed in a second plane parallel to the base plane in proximity to the position of an image formed by a perpendicular projection of the tension member from the base plane to the second plane.

2. An optical cable according to claim 1, wherein the optical fiber core is an optical fiber ribbon comprising a plurality of optical fibers having, at opposite ends thereof, centers generally aligned in a flat plane to form an alignment line that is perpendicular to the base plane.

3. A method for manufacturing an optical cable by disposing in parallel and covering with a sheath by extrusion at least one optical fiber core and a tension member having a curving tendency, wherein either
    providing the tension member with a curving tendency in a predetermined direction that defines a curve in a base plane taken through a section of the tension member and disposing the optical fiber core in a second plane parallel to the base plane in proximity to the position of an image formed by a perpendicular projection of the tension member from the base plane to the second plane, or disposing the optical fiber core and the tension member in parallel, covering the core and tension member with a sheath by extrusion, and providing the tension member with a curving tendency that defines a curve in a base plane taken through a section of the tension member, wherein the optical fiber is disposed in a second plane parallel to the base plane in proximity to the position of an image formed by a perpendicular projection of the tension member from the base plane to the second plane.

4. A method for manufacturing an optical cable according to claim 3, wherein the optical fiber core is an optical fiber ribbon comprising a plurality of optical fibers having, at opposite ends thereof, centers generally aligned in a flat plane to form an alignment line that is perpendicular to the base plane.

5. A method for manufacturing an optical cable according to claim 3, wherein the step of providing the tension member with a curving tendency of a predetermined direction comprises winding the tension member or the optical cable around the periphery of a disc or cylinder.

* * * * *